United States Patent
Mason, Jr. et al.

(10) Patent No.: US 9,274,896 B2
(45) Date of Patent: *Mar. 1, 2016

(54) VERSIONED FILE SYSTEM WITH FAST RESTORE

(71) Applicant: Nasuni Corporation, Natick, MA (US)

(72) Inventors: Robert S. Mason, Jr., Uxbridge, MA (US); David M. Shaw, Newton, MA (US); Kevin W. Baughman, Natick, MA (US); Stephen Fridella, Watertown, MA (US)

(73) Assignee: Nasuni Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/450,951

(22) Filed: Aug. 4, 2014

(65) Prior Publication Data

US 2015/0120675 A1 Apr. 30, 2015

Related U.S. Application Data

(63) Continuation of application No. 12/871,198, filed on Aug. 30, 2010, now Pat. No. 8,799,231.

(51) Int. Cl.
*G06F 17/30* (2006.01)
*G06F 11/14* (2006.01)

(52) U.S. Cl.
CPC ........ *G06F 11/1448* (2013.01); *G06F 17/3023* (2013.01)

(58) Field of Classification Search
CPC ............ G06F 11/1451; G06F 11/1469; G06F 11/1458; G06F 11/1448; G06F 17/30067; G06F 17/30575; G06F 17/3023
See application file for complete search history.

(56) References Cited

U.S. PATENT DOCUMENTS

| | | | |
|---|---|---|---|
| 5,787,480 | A | 7/1998 | Scales et al. |
| 5,819,292 | A | 10/1998 | Hitz et al. |
| 5,941,972 | A | 8/1999 | Hoese et al. |
| 6,694,336 | B1 | 2/2004 | Multer et al. |

(Continued)

FOREIGN PATENT DOCUMENTS

WO WO2007100702 A2 9/2007

OTHER PUBLICATIONS

Korean Intellectual Property Office, "International Search Report for PCT/US11/49366", Mar. 5, 2012, WIPO.

(Continued)

*Primary Examiner* — Yuk Ting Choi
(74) *Attorney, Agent, or Firm* — Intrinsic Law Corp.; Ibrahim M. Hallaj

(57) ABSTRACT

A versioned file system comprises a set of structured data representations. Each structured data representation corresponds to a version, and each version comprises a tree of write-once objects. Each version in the versioned file system has associated therewith a borrow window. When it is desired to reconstruct the file system to a point in time, i.e., to perform a "restore," it is only required to walk a single structured data representation. During a restore, metadata is pulled back from the cloud first, so users can see the existence of needed files immediately. The remainder of the data is pulled back from the cloud when the user goes to open the file. As a result, the entire file system is restored to a previous time nearly instantaneously. A fast restore is performed if an object being restored exists within a borrow window of the version from which the system is restoring.

17 Claims, 14 Drawing Sheets

(56) References Cited

U.S. PATENT DOCUMENTS

| | | | |
|---|---|---|---|
| 6,889,309 | B1 | 5/2005 | Oliveira et al. |
| 7,246,140 | B2 | 7/2007 | Therrien et al. |
| 7,246,275 | B2 | 7/2007 | Therrien et al. |
| 7,318,063 | B2 | 1/2008 | Brychell et al. |
| 7,523,277 | B1 | 4/2009 | Kekre et al. |
| 7,526,720 | B1 | 4/2009 | Kuwamoto et al. |
| 7,587,431 | B1 * | 9/2009 | Rao et al. ............... 707/999.202 |
| 7,593,966 | B2 | 9/2009 | Therrien et al. |
| 7,620,658 | B2 | 11/2009 | Benson et al. |
| 7,752,492 | B1 | 7/2010 | Armangau et al. |
| 7,831,540 | B2 | 11/2010 | Medi et al. |
| 7,904,466 | B1 | 3/2011 | Valencia et al. |
| 7,925,623 | B2 | 4/2011 | Therrien et al. |
| 8,306,948 | B2 | 11/2012 | Chou et al. |
| 8,341,363 | B2 | 12/2012 | Chou et al. |
| 8,566,362 | B2 | 10/2013 | Mason, Jr. et al. |
| 8,572,045 | B1 * | 10/2013 | Shah .......................... 707/679 |
| 8,799,231 | B2 * | 8/2014 | Mason et al. .................. 707/679 |
| 8,880,474 | B2 | 11/2014 | Mason, Jr. et al. |
| 8,990,272 | B2 | 3/2015 | Mason, Jr. et al. |
| 2002/0046043 | A1 | 4/2002 | Smith et al. |
| 2002/0062356 | A1 | 5/2002 | Clarke et al. |
| 2003/0018878 | A1 * | 1/2003 | Dorward et al. ............... 711/216 |
| 2003/0154314 | A1 | 8/2003 | Mason et al. |
| 2003/0158834 | A1 | 8/2003 | Sawdon et al. |
| 2003/0229656 | A1 | 12/2003 | Hitz et al. |
| 2004/0111422 | A1 | 6/2004 | Devarakonda et al. |
| 2004/0153736 | A1 | 8/2004 | Viswanathan et al. |
| 2004/0186858 | A1 | 9/2004 | McGovern et al. |
| 2004/0193703 | A1 | 9/2004 | Loewy et al. |
| 2004/0205585 | A1 | 10/2004 | McConnell et al. |
| 2004/0254936 | A1 | 12/2004 | Mohamed |
| 2005/0027757 | A1 | 2/2005 | Kiessig et al. |
| 2005/0071379 | A1 | 3/2005 | Kekre et al. |
| 2005/0076066 | A1 | 4/2005 | Stakutis et al. |
| 2005/0091448 | A1 | 4/2005 | Nakatani et al. |
| 2005/0114363 | A1 | 5/2005 | Borthakur et al. |
| 2005/0278382 | A1 | 12/2005 | LaRocca et al. |
| 2006/0010174 | A1 | 1/2006 | Nguyen et al. |
| 2006/0047813 | A1 | 3/2006 | Aggarwal et al. |
| 2006/0075391 | A1 | 4/2006 | Esmonde et al. |
| 2006/0080370 | A1 | 4/2006 | Torii et al. |
| 2006/0112116 | A1 | 5/2006 | McConnell |
| 2006/0123016 | A1 | 6/2006 | Ashok et al. |
| 2006/0224626 | A1 | 10/2006 | Lakshminath et al. |
| 2007/0038697 | A1 | 2/2007 | Zimran et al. |
| 2007/0050707 | A1 | 3/2007 | Liu et al. |
| 2007/0124345 | A1 | 5/2007 | Heinz et al. |
| 2007/0130229 | A1 | 6/2007 | Anglin et al. |
| 2007/0185896 | A1 | 8/2007 | Jagannath et al. |
| 2007/0198907 | A1 | 8/2007 | Degala et al. |
| 2007/0208782 | A1 | 9/2007 | Carter et al. |
| 2007/0260830 | A1 | 11/2007 | Faibish et al. |
| 2008/0034327 | A1 | 2/2008 | Cisler et al. |
| 2008/0172542 | A1 | 7/2008 | Kaushik |
| 2008/0183973 | A1 | 7/2008 | Aguilera et al. |
| 2008/0195677 | A1 | 8/2008 | Sudhakar et al. |
| 2008/0222607 | A1 | 9/2008 | Gan et al. |
| 2008/0243953 | A1 | 10/2008 | Wu et al. |
| 2008/0244028 | A1 | 10/2008 | Le et al. |
| 2008/0307016 | A1 | 12/2008 | Hornkvist et al. |
| 2009/0063400 | A1 | 3/2009 | Borkar et al. |
| 2009/0070536 | A1 | 3/2009 | Nasre |
| 2009/0083056 | A1 | 3/2009 | Gole et al. |
| 2009/0112890 | A1 | 4/2009 | Medi et al. |
| 2009/0112945 | A1 | 4/2009 | Camble et al. |
| 2009/0144342 | A1 | 6/2009 | Sudhakar |
| 2009/0144395 | A1 | 6/2009 | Desalvo |
| 2009/0164527 | A1 | 6/2009 | Spektor et al. |
| 2009/0171971 | A1 | 7/2009 | Goddard et al. |
| 2009/0187530 | A1 | 7/2009 | Nair et al. |
| 2009/0198749 | A1 | 8/2009 | Barzilai et al. |
| 2009/0240737 | A1 | 9/2009 | Hardisty et al. |
| 2009/0260007 | A1 | 10/2009 | Beaty et al. |
| 2009/0300076 | A1 | 12/2009 | Friedman et al. |
| 2010/0088277 | A1 * | 4/2010 | Rao et al. ...................... 707/637 |
| 2010/0161759 | A1 | 6/2010 | Brand |
| 2010/0250497 | A1 | 9/2010 | Redlich et al. |
| 2011/0276713 | A1 | 11/2011 | Brand |
| 2012/0079368 | A1 | 3/2012 | Abdelaziz et al. |
| 2012/0303586 | A1 | 11/2012 | Drath et al. |
| 2014/0237008 | A1 | 8/2014 | Mason, Jr. et al. |
| 2015/0052111 | A1 | 2/2015 | Mason, Jr. et al. |

OTHER PUBLICATIONS

Garimella, "Understanding and exploiting snapshot technology for data protection, Part 1: Snapshot technology overview", developerWorks, Apr. 26, 2006, IBM, http://www.ibm.com/developerworks/tivoli/library/t-snaptsml/index.html.

* cited by examiner nasuni filer home | volumes | shares | snapshots | configuration | status | notifications Hello, admin - Last Login: July 23, 2010
help • release notes • shutdown • logout Volume Name: dogfood ▽   Jul 13, 2010  [14]  01:25:27 PM ⏱ ▽   ☐ Take snapshot now Search Restoring objects from snapshot...

Restore from Snapshot
July 13 2010, 01:25:27 PM - version 4674
(2010/Jul/13/17.25.27GMT)

Selection
2 items selected

Restore Destination
☐ Original Folder                          [ Change ]

Options
☑ Back up existing files before restoring
If a file being restored has the same name as one already in the volume, it will be backed up. The backup file will start with backup and a number, such as "backup0004".

1902 ⟶ [ Restore ]

Version: 1.9.0 • Last Snapshot Completed: Fri, 23 Jul - 11:01AM

2010 © Nasuni Corporation - All Rights Reserved

VERSIONED FILE SYSTEM WITH FAST RESTORE

BACKGROUND OF THE INVENTION

1. Technical Field

This application relates generally to data storage.

2. Background of the Related Art

It is known to provide an interface between an existing local file system and a data store (e.g., a "write-once" store) to provide a "versioned" file system. The versioned file system comprises a set of structured data representations, such as XML. In a representative embodiment, at a first time, the interface creates and exports to a data store a first structured data representation corresponding to a first version of the local file system. The first structured data representation is an XML tree having a root element, a single directory (the "root directory") under the root element, zero or more directory elements associated with the root directory, and zero or more elements (such as files) associated with a given directory element. Each directory in turn can contain zero or more directories and zero or more files. Upon a change within the file system (e.g., file creation, file deletion, file modification, directory creation, directory deletion and directory modification), the interface creates and exports a second structured data representation corresponding to a second version of the file system. The second structured data representation differs from the first structured data representation up to and including the root element of the second structured data representation. Thus, the second structured data representation differs from the first structured data representation in one or more (but not necessarily all) parent elements with respect to the structured data element in which the change within the file system occurred. The interface continues to generate and export structured data representations to the data store, preferably at given "snapshot" times when changes within the file system have occurred. The data store comprises any type of back-end storage device, system or architecture. In one embodiment, the data store comprises one or more cloud storage service providers. As necessary, a given structured data representation is then used to retrieve an associated version of the file system. In this manner, the versioned file system only requires write-once behavior from the data store to preserve its complete state at any point-in-time.

BRIEF SUMMARY

A versioned file system comprises a set of structured data representations, such as XML. Each structured data representation corresponds to a "version," and each version comprises a tree of write-once objects rooted at a root directory manifest. Each version in the versioned file system has associated therewith a "borrow window." When it is desired to reconstruct the file system or any portion thereof (including just a single file) to a point in time (or, more generally, a given state), i.e., to perform a "restore," it is only required to jump to (and use) a particular node in a single structured data representation, and the identity of that node is known from the file being restored. During a restore, an existing file (or, more generally, a portion of the file system) is associated into a new place in the file system, which results in two identifiers (e.g., filenames) within the file system pointing to the same (single) object. Only the metadata for the existing file (or file system portion) being associated into a new place in the file system is necessary to do a restore; thus, a restore operation occurs quickly, and without regard to the size of the file (or file system portion). In effect, the metadata for the file (or file system portion) being restored is pulled back from the cloud first, so users can see the existence of needed files immediately. The remainder of the data is then pulled back from the cloud if/when the user goes to open the file. As a result, the entire file system or any portion thereof can be restored to a previous time nearly instantaneously. A "fast" restore is performed if an object being restored exists within a "borrow window" of the version from which the system is restoring.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 19 illustrates a restore-in-progress display screen on the web-based display interface after the user has selected the Restore button; and FIG. 20 illustrates the web-based display interface displaying a restore completion notification indicating that the restore is complete.

DETAILED DESCRIPTION

Figure 1:
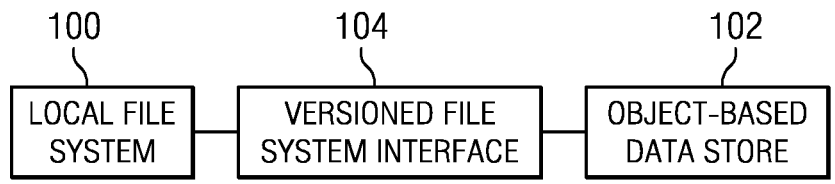
FIG. 1 is a block diagram illustrating how a known versioned file system interfaces a local file system to an object-based data store.

FIG. 1 illustrates a local file system 100 and an object-based data store 102. Although not meant to be limiting, preferably the object-based data store 102 is a "write-once" store and may comprise a "cloud" of one or more storage service providers. An interface 104 provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired. The interface 104 provides for a file system that has complete data integrity to the cloud without requiring global locks. In particular, this solution circumvents the problem of a lack of reliable atomic object replacement in cloud-based object repositories. The interface 104 is not limited for use with a particular type of back-end data store. When the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent. In one embodiment, the VFS resides within a single storage service provider (SSP) although, as noted above, this is not a limitation. In another embodiment, a first portion of the VFS resides in a first SSP, while a second portion resides in a second SSP. Generalizing, any given VFS portion may reside in any given data store (regardless of type), and multiple VFS portions may reside across multiple data store(s). The VFS may reside in an "internal" storage cloud (i.e. a storage system internal to an enterprise), an external storage cloud, or some combination thereof.

The interface 104 may be implemented as a machine. A representative implementation is the Nasuni® Filer, available from Nasuni Corporation of Massachusetts. Thus, for example, typically the interface 104 is a rack-mounted server appliance comprising hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMware®, or the like), as software executing in a server, or as software executing on the native hardware resources of the local file system. The interface 104 serves to transform the data representing the local file system (a physical construct) into another form, namely, a versioned file system comprising a series of structured data representations that are useful to reconstruct the local file system to any point-in-time. A representative VFS is the Nasuni Unity File System (UniFS™). Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representations (e.g., XML documents) that together comprise the versioned file system. The data representations are stored in the data store. Preferably, the XML representations are encrypted before export to the data store. The transport may be performed using known techniques. In particular, REST (Representational State Transfer) is a lightweight XML-based protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

Figure 2:
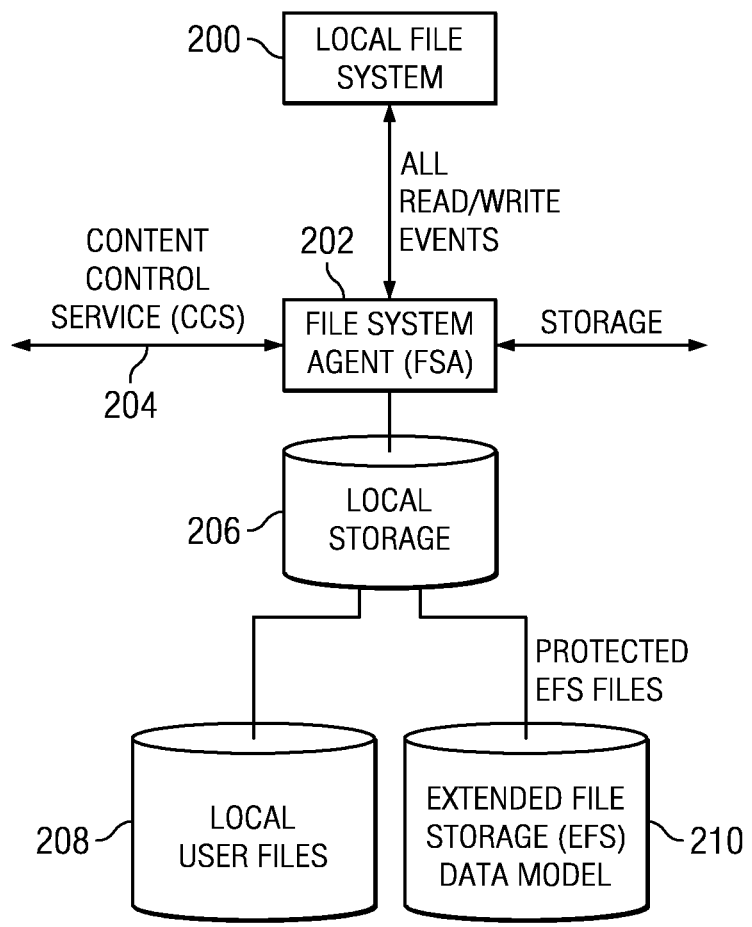
FIG. 2 is a block diagram of a representative implementation of a portion of the interface shown in FIG. 1.

FIG. 2 is a block diagram of a representative implementation of how the interface captures all (or given) read/write events from a local file system 200. In this example implementation, the interface comprises a file system agent 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described)) that are exported to the back-end data store (e.g., the cloud).

Figure 3:
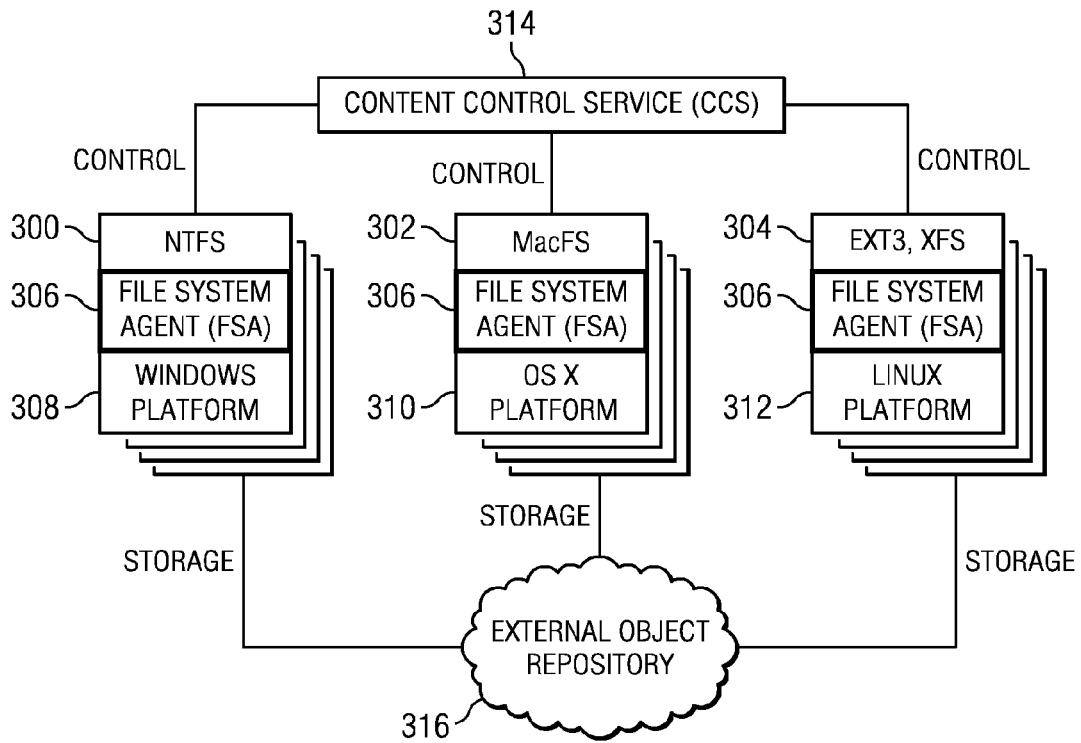
FIG. 3 is a more detailed implementation of the interface where there are a number of local file systems of different types.

FIG. 3 is a block diagram illustrating how the interface may be used with different types of local file system architectures. In particular, FIG. 3 shows the CCS (in this drawing a Web-based portal) controlling three (3) FSA instances. Once again, these examples are merely representative and they should not be taken to limit the invention. In this example, the file system agent 306 is used with three (3) different local file systems: NTFS 300 executing on a Windows operating system platform 308, MacFS (also referred to as "HFS+" (HFSPlus)) 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
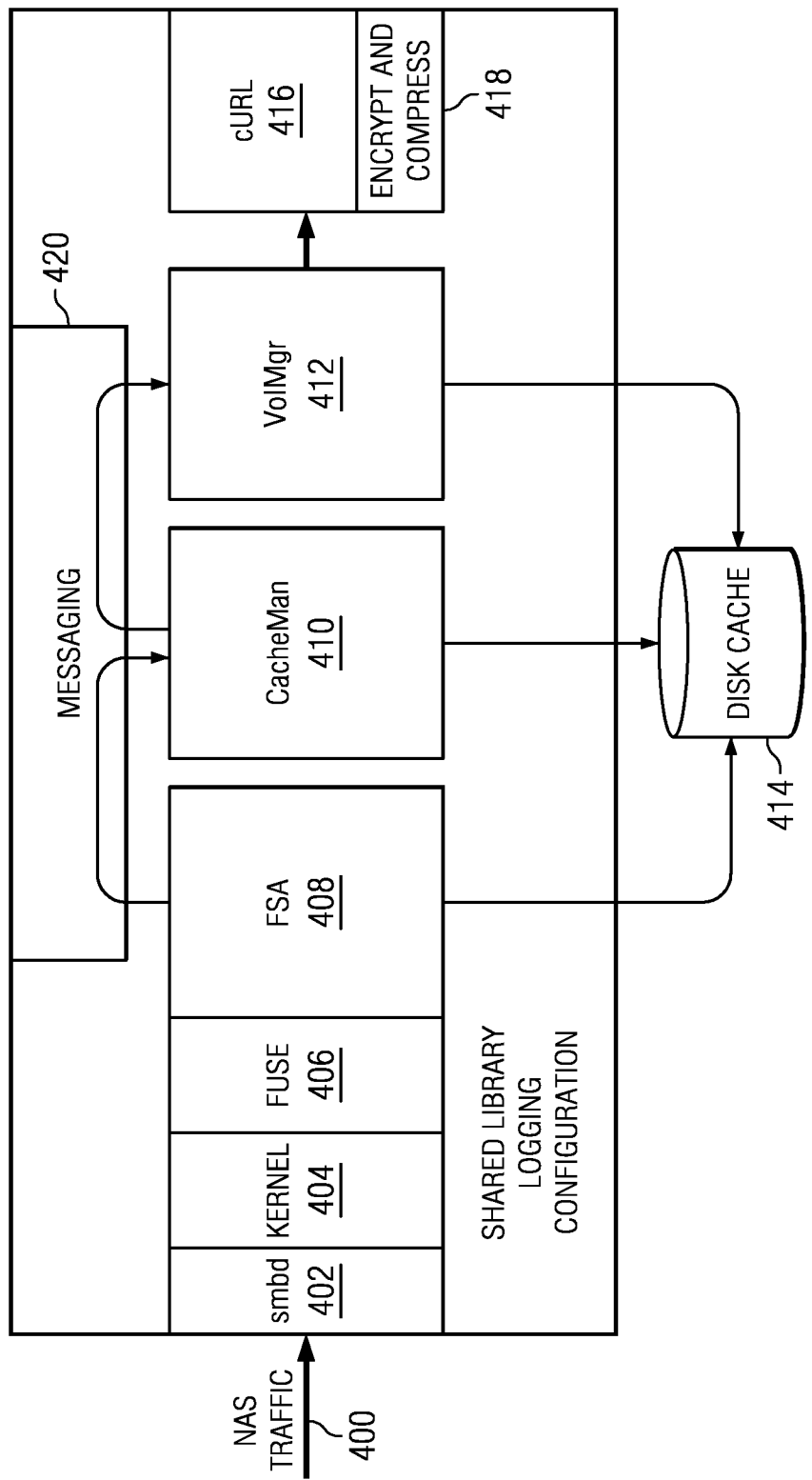
FIG. 4 illustrates the interface implemented as an appliance within a local processing environment.

FIG. 4 illustrates the interface implemented as an appliance within a local processing environment. In this embodiment, the local file system traffic 400 is received over Ethernet and represented by the arrow identified as "NAS traffic." That traffic is provided to smbd layer 402, which is a SAMBA file server daemon that provides CIFS (Windows-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface described herein to maintain a local cache of the data structures (the structured data representations) that comprise the versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. cURL is a library and command line tool for transferring files with URL syntax that supports various protocols such as FTP, FTPS, HTTP, HTTPS, SCP, SFTP, TFTP, TEL-NET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

The interface shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The versioned file system may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store.

As described above, the file system agent 408 is capable of completely recovering from the cloud (or other store) the state of the native file system and providing immediate file system access (once FSA metadata is recovered). The FSA can also recover to any point-in-time for the whole file system, a directory and all its contents, a single file, or a piece of a file. These and other advantages are provided by the "versioned file system" of this disclosure, as it now described in more detail below.

Figure 5:
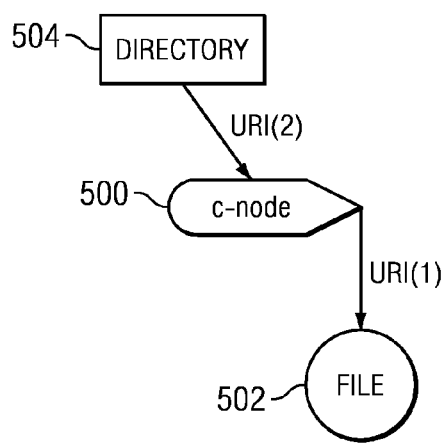
FIG. 5 illustrates a portion of a file system "tree" showing the basic component elements that are used to create a structured data representation of the "versioned" file system according to the teachings herein.

FIG. 5 is a representation of a portion of a tree showing the basic elements that are represented in a versioned file system according to one embodiment. The reference numeral 500 is a c-node (or "cloud" node). A c-node preferably contains all of the information passed by a file system agent instance about an inode (or inode-equivalent) local file system. As will be seen in the examples below, the inode subset of the c-node includes data that would be returned by a typical "stat" function call, plus any additional extended attributes that are file system-dependent. One or more remaining parts of the c-node are used to provide a CCS super-user with additional access control and portability across specific file system instances. Stated another way, c-nodes preferably act as super-nodes for access control to files and metadata. While the inode substructure contains information from the original local file system, c-nodes allow administrators of the system to gain access to files in a portable, file system-independent manner. Preferably, each c-node is addressable by a URI. A c-node preferably also includes a pointer to the actual location of the data file. C-nodes indicate where the remote copies of the item may be found in the data store. The reference numeral 502 is a data file. This object represents the file preferably as it was created in the local file system. One of the main benefits to isolating the metadata in the c-nodes is that a user's data files can be stored with no modifications. As in a traditional file system, preferably the name of the file is stored in the directory or directories that contain it and not as a part of the file itself. Preferably, URIs (for the actual data files in the cloud) remain opaque to the end-users, although this is not a requirement. An FSA instance controls access to the data file URIs through the respective c-nodes. The reference numeral 504 is a directory. Directories are c-nodes that contain a simple list relating names to the corresponding URIs for other c-nodes that, in turn, point to other files or directories. Directories provide a convenient way to establish a namespace for any data set. There can be multiple directories that point to the same files or directories. The above-described approach can support hard links or symbolic links. Hard links are simply multiple name entries that point to the same c-node. A symbolic link is a name entry that contains another name inside; when resolving the link, the entry is read and the resolution process is then restarted using the inner name. Directories are owned by their own c-node, which preferably holds its metadata and controls access to it.

Figure 6:
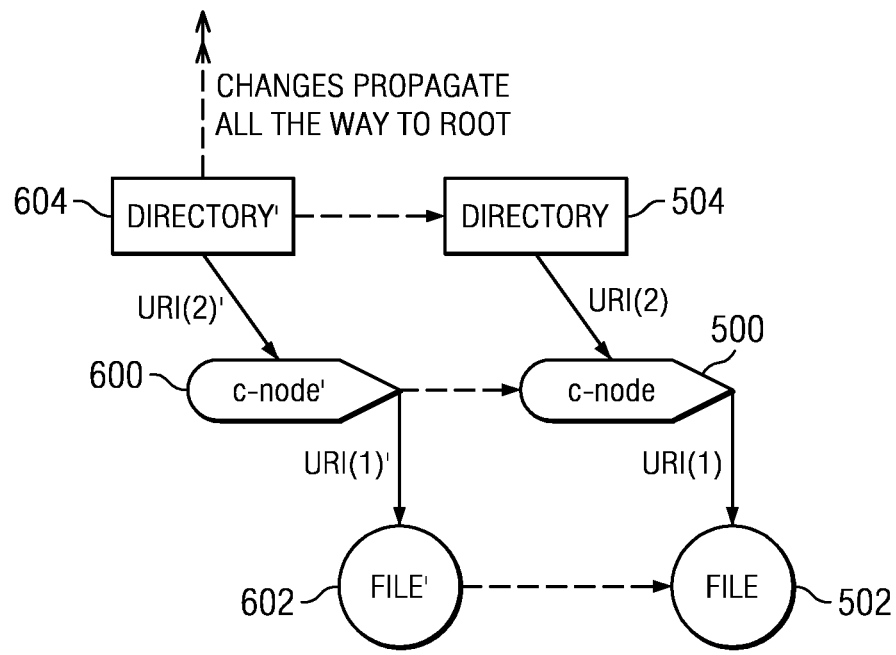
FIG. 6 illustrates the portion of the tree (as shown in FIG. 5) after a change to the contents of the file has occurred in the local file system.

FIG. 6 illustrates the portion of the tree (as shown in FIG. 5) after a change to the contents of the file 502 has occurred in the local file system. In this example, which is merely representative, a new version of the local file system is then created (preferably at a "snapshot" period, which is configurable). The new version comprises the file 602, the new c-node 600, and the new directory 604. As also seen in this drawing, the changes to the tree also propagate to the root. In particular, upon a given occurrence in the local file system (as will be described), a "new version" of the file system is created (for export to the cloud), and this new version is represented as a new structured data representation (e.g., a new XML document). As will be seen, the new structured data representation differs from the prior version in one or more parent elements with respect to the structured data element in which the change within the file system occurred. Thus, upon a change within the file system, the interface creates and exports to the data store a second structured data representation corresponding to a second version of the file system, and the second structured data representation differs from the first structured data representation up to and including the root element of the second structured data representation. In this manner, the interface provides for a "versioned" file system that has complete data integrity to the data store without requiring global locks.

The second structured data representation may "borrow" unchanged parts of the first structured data representation. Thus, the second structured data representation does not need to construct or even consider parts of the tree that were not changed; it just points to the same c-nodes that the first structured data representation does.

Figure 7:
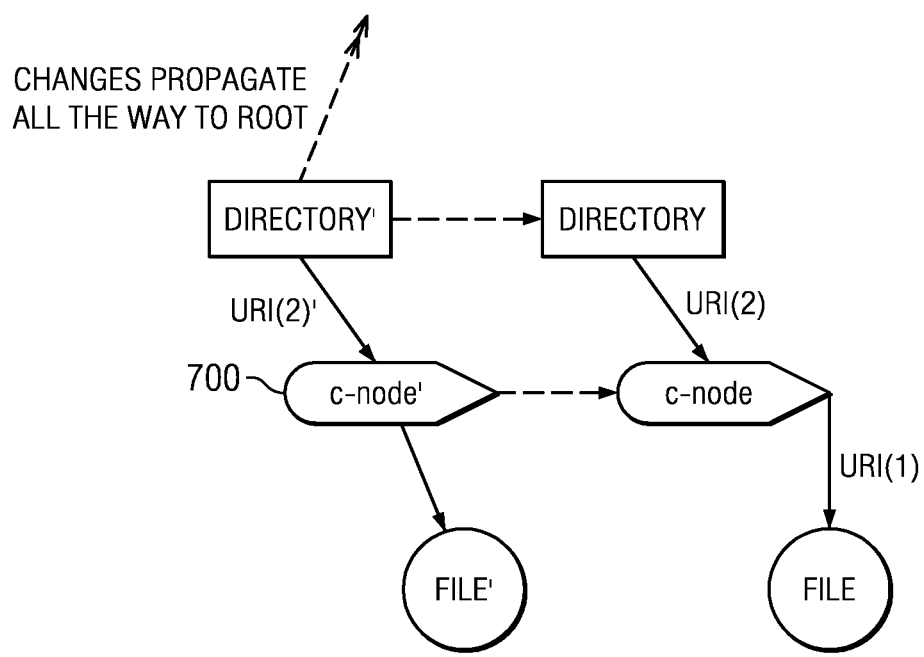
FIG. 7 illustrates the portion of the tree (as shown in FIG. 5) after a change to the contents of the c-node has occurred.
Figure 8:
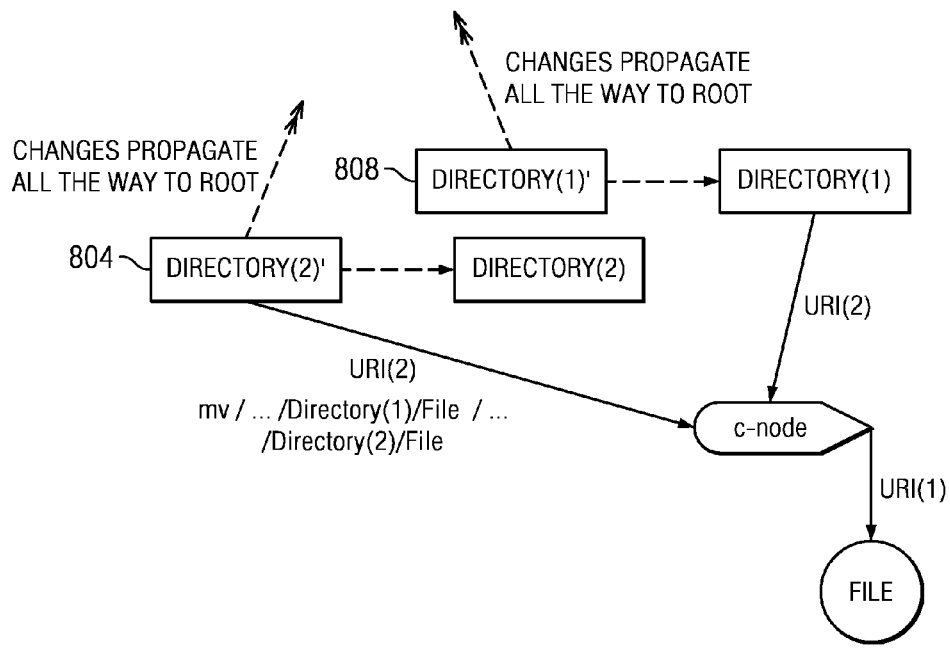
FIG. 8 illustrates the portion of the tree (as shown in FIG. 5) after a change to the contents of a directory has occurred.

FIG. 6 illustrates one type of change (a file update) that triggers the generation of a new version. FIG. 7 illustrates another type of change (an update to c-node 700) that also triggers the generation of a new version with changes propagated to root, and FIG. 8 illustrates yet another type of change (an update to each of the directories 804 and 808) that also implements a new version, once again with changes propagated to root. Generalizing, while the types of changes that trigger a new version may be quite varied, typically they include one of the following: file creation, file deletion, file modification, directory creation, directory deletion and directory modification. This list is representative.

Figure 9:
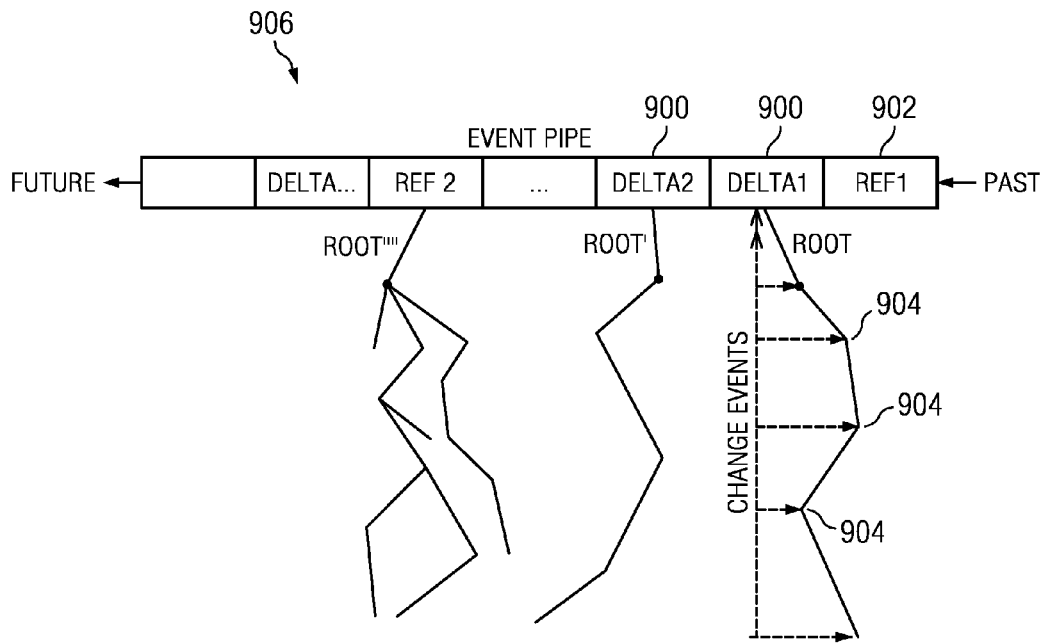
FIG. 9 illustrates how a number of file changes are aggregated during a snapshot period and then exported to the cloud as a new version.

Moreover, as noted, it is possible but not required that a new version be created at the time of the actual change in the local file system; typically, the new version is created after a "snapshot" of the local file system is taken, and a number of change events may occur during a given snapshot period. FIG. 9 illustrates this approach. As seen in this drawing, an FSA instance preferably aggregates all of the changes to the local file system in two ways: delta frames 900, and reference frames 902. The delta frames 900 control the number (and size) of the objects that need to be stored in cloud storage. As noted above, preferably every local file system event is recorded by the FSA instance as a change event 904. As noted, new inodes, directories and files trigger corresponding new entities (created by FSA) in the cloud; however, preferably modifications to existing structures create change events that are aggregated by FSA into a single new entity, the delta frame 900. A delta frame 900 starts with a new root that represents the current state of the file system. Preferably, the FSA instance compiles the delta frame information such that each of the new entry points (i.e. any modifications to the previous version) to c-nodes, directories and files are represented as new versions of the data structures plus pointers to the old structures. To reconstruct the current state of a local file system, an FSA client only has to walk a tree for any version to see all the correct items in the tree. Reference frames 902 are also compiled by FSA and contain an aggregation of the previous reference frame plus all the intervening delta frames.

A given reference frame 902 may be thought of as an entire copy with no references to previous versions, while a delta frame 900 may be thought of as including pointers to older versions. In other words, a delta frame logically is a combination of a current version and one or more prior versions. Each frame (reference or delta) may be considered a complete file system from a tree-walk perspective. This means that a walk of the tree, by itself, is all that is required to restore the file system (or any portion thereof, including a single file) to its associated state or point-in-time (as represented by the tree).

Preferably, by pointing to the same c-node that a previous version did, each version is complete in and of itself. There is no need to regenerate a "full" copy of a given version, as preferably each version is always full.

When it is desired to reconstruct the file system to a point in time (or, more generally, a given state), i.e., to perform a "restore," it is only required to walk (use) a single structured data representation (a tree). In other words, one and only one VFS tree may be used to identify a prior state of the local file system. It is not required to jump across multiple trees for this purpose.

Figure 10:
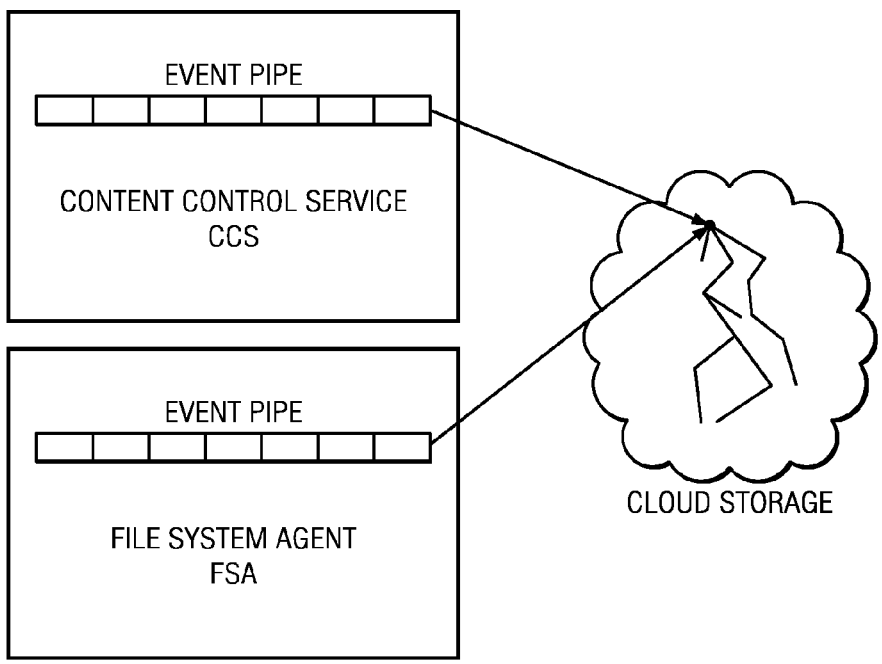
FIG. 10 illustrates how CCS maintains an event pipe.

Frames preferably are stored in an event pipe 906. As will be seen, the event pipe is implemented in a structured data representation as a table of contents (TOC), although this is not a limitation. Preferably, this data structure is held both at the FSA instance and at CCS, as illustrated in FIG. 10. The event pipe (with its entry points into cloud storage) is then the primary means to access all files stored remotely. In particular, one of ordinary skill in the art will appreciate that this is a lightweight data structure that preferably contains only versions of root for the given volume. Although it is desired that CCS be highly available, preferably the "writes" occur periodically in a transaction safe way as controlled by FSAs. The "reads" are only necessary when an FSA copy has failed; therefore, CCS can be run using an ordinary (high-availability) database or file-based back-end. Preferably, the mix of delta and reference frames in the event pipe is chosen to balance storage and bandwidth utilization against a practical recovery time for FSA to create a new local file system instance. The composition of the event pipe can also be set according to a configurable policy. For instance, users may choose to keep only so many versions or versions dating back to a specific date.

Figure 11:
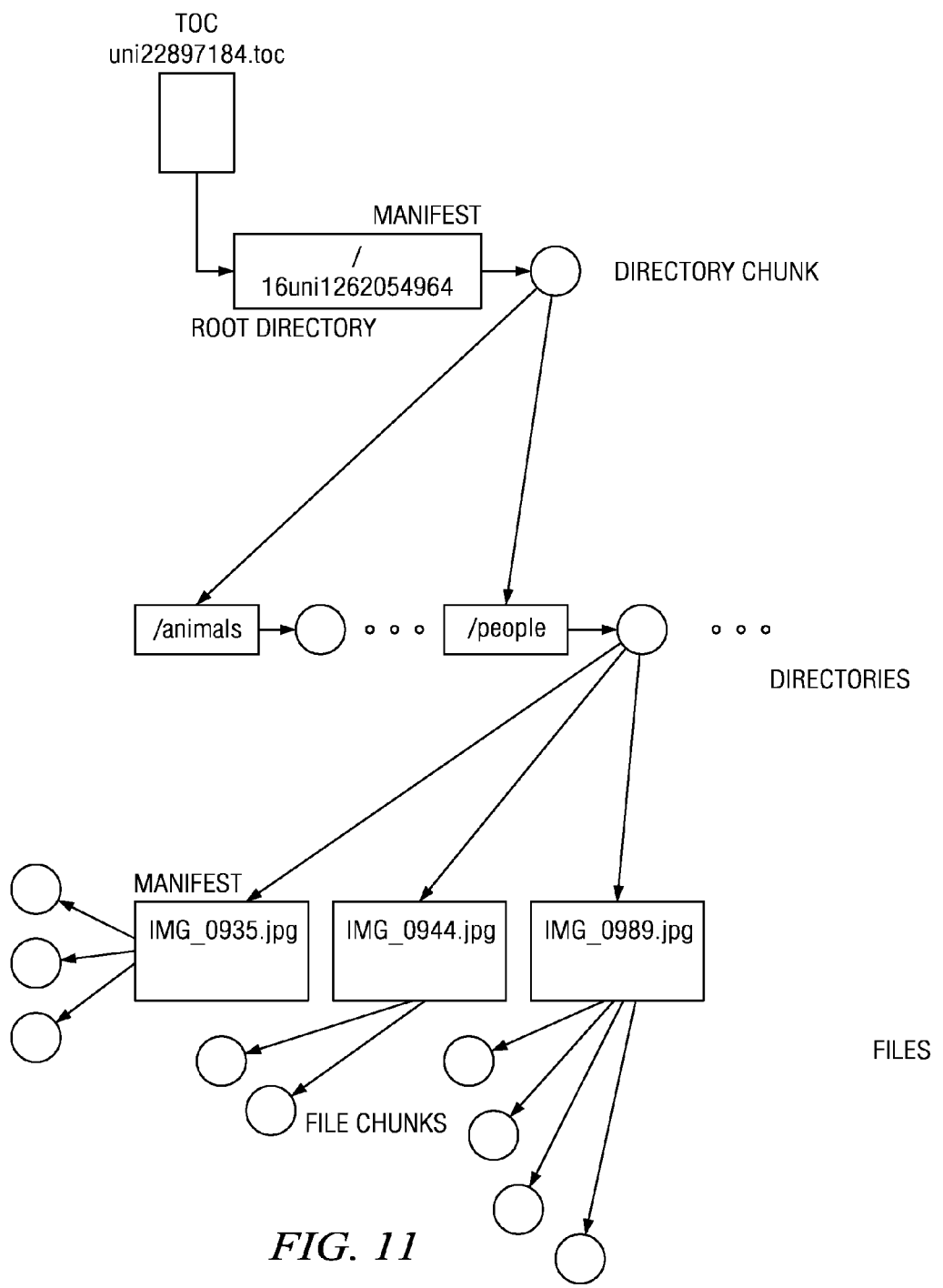
FIG. 11 illustrates a simple directory tree pushed to the cloud.
Figure 12:
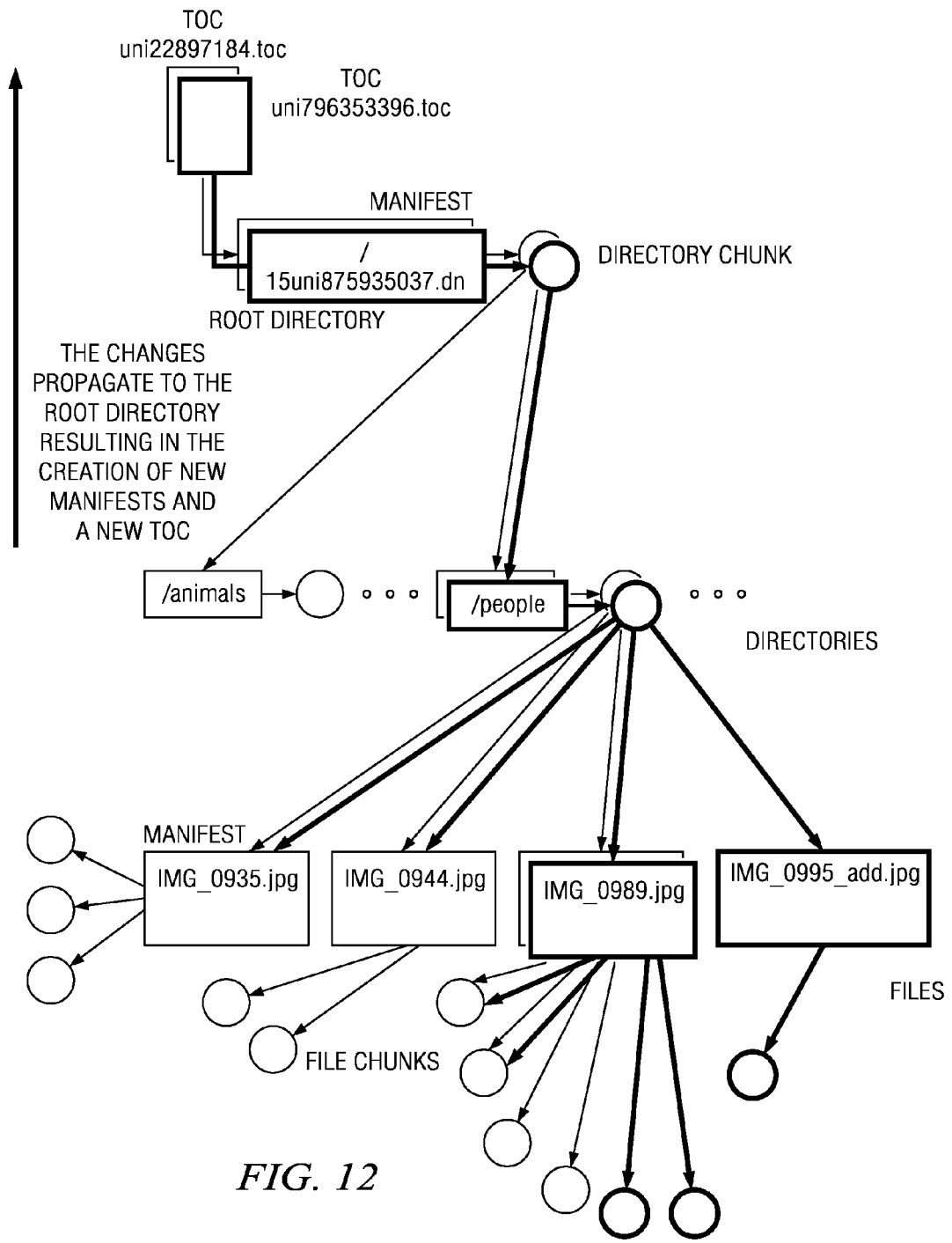
FIG. 12 illustrates the new version thereof following changes in the local file system.

FIG. 11 illustrates a directory tree in the cloud, and FIG. 12 illustrates the new version of that tree following several changes in the local file system. FIG. 11 is a simplified diagram. Because the data store is write-once, a directory tree is pushed in two phases: phase 1 is all files (in any order), and phase 2 is all directories (in strict depth-first order). This allows a directory (in which the file or another directory is rooted) to be always written after the child file or directory is written.

Restore and Prune

In a versioned cloud file system according to embodiment described in Ser. No. 12/483,030, filed Jul. 11, 2009, the disclosure of which is incorporated herein by reference, a versioned file system (VFS) comprises a set of structured data representations such as XML documents and document fragments. Names are object references that typically are not parsed by the system. The handle names typically have no relation to the actual file names or content. The handle names in the XML preferably are prefixed with a length component.

Also, for items other than the table of contents (TOC), the path and version elements in the XML are informative and need not be used by the system. The "path" typically represents the originating path (in the local file system) when the item was last updated. The "version" typically represents the version of root at the time the item was last updated. The table of contents (TOC) is a table at the head of every version; preferably, the TOC contains references to all versions.

Fast Restore

During a restore, preferably metadata is pulled back from the cloud first, so users can see the existence of needed files immediately. The remainder of the data is then pulled back from the cloud if/when the user goes to open the file. As a result, the entire file system (or any portion thereof, including a single file) can be restored to a previous time nearly instantaneously. The metadata appears first (and is stitched into the file system, where it remains available for immediate use), and then the cache gradually fills with the associated files as they are requested (and as they are streamed back from the cloud). From the user's perspective, however, it will appear as if the data is actually present (restored) once merely the metadata is returned.

As used herein, a "fast" restore is said to be performed if an object being restored exists within a "borrow window" of the version from which the system is restoring. During a fast restore, the file (or, more generally, file system portion) being restored is associated into a new place in the file system, which results in two identifiers (e.g., filenames) within the file system pointing to the same (single) object. As noted above, the metadata for the file (or file system portion) being restored is pulled back from the cloud first, so users can see the existence of needed files immediately. The remainder of the data is then pulled back from the cloud if/when the user goes to open the file. This enables the file system portion to be restored to a previous time nearly instantaneously.

Typically, a restore is triggered by a user choosing to restore his/her/its data. In a representative embodiment, a user opens an interface (e.g., a web-based UI) and selects a file (data, time, snapshot, etc.) and selects a "restore" button. The system determines whether the restore will proceed on a "fast" basis based on a "borrow window." By way of brief background, each version in the versioned file system is identified as a particular version (typically by a version number) and has associated therewith a "borrow window," which preferably is an integer value. A most-recently created version is a "current" version. In the context of a fast restore operation, the borrow window of interest is the borrow window of the older version from which an object is being restored. As used herein, this construct is sometimes referred to as the "restore" borrow window. Each individual version has its own associated borrow window, and for a set of versions, each borrow window may be different. A "borrow window" is sometimes referred to as a "borrowing window" or "window."

If a user-initiated restore requires objects from a version outside the restore borrow window, the system performs a "slow restore" (with respect to versions outside the restore borrow window) to copy from an old version to the latest version as necessary. The word "slow" in the phrase "slow restore" does not necessarily have temporal implications; by definition, a "slow restore" is a state or status associated with a new file that just happens to have the same name and content as an older file. The metadata for a new file, like all new files, is available when the file is written.

The following describes additional details of the preferred "fast restore" functionality. As noted above, generally this function works by borrowing dependencies from one or more prior versions. Suppose it is desired to restore file "/A/B/C" from version X to the current version Y at "/A/B/C." As noted above, a version has a "borrow window" value (typically an integer), which value preferably is advertised. The borrow window for a version may differ from the borrowing window from another version. The fast restore process begins by determining the "version created" of all chunks of "/A/B/C/" in version X. For each chunk i in the manifest, the fast restore operation sets the "version created" of i be $V_i$. Then, a fast restore is permitted if and only if, for all i, $(Y-V_i)$ is less than or equal to the borrow window advertised by version $V_i$. If this condition is met (at an individual object level), the fast restore function proceeds as follows.

The manifest for "/A/B/C" in version X is already present in the cloud. Its handle is obtained. Then, a new directory entry "C" in created in "/A/B." This directory entry includes the same attributes as "/A/B/C" from X (this is the borrowing), as well as the handle of the original file manifest that was just obtained. A next push then commits the modified directory "A/B" to the cloud. As a result, the chunk objects and manifest of "A/B/C" are now referenced from different versions X and Y.

Figure 13:
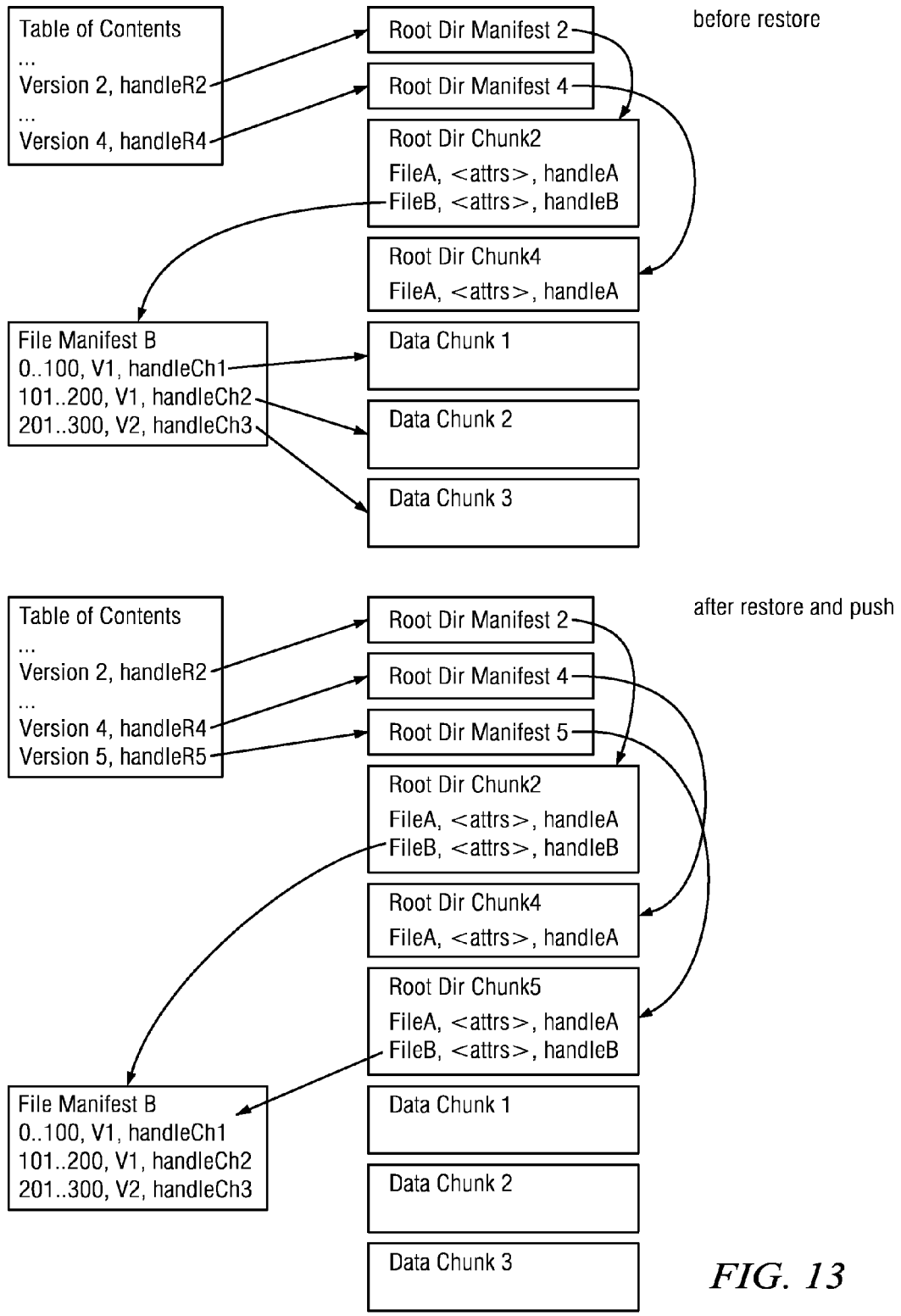
FIG. 13 illustrates a representative restore operation.

FIG. 13 illustrates the fast restore process by way of example. This is a fast restore of a File B from version 2, to a current version. Before the restore, the latest version in the cloud (version 4) has no File B. After the restore and a push of version 5, the latest version in the cloud (version 5) has an entry for File B, which entry points directly to the original manifest. There are now two entries pointing to the same manifest, and the manifest is referenced from version 2 and version 5. The data chunks of B are referenced from the single manifest.

Figure 17:
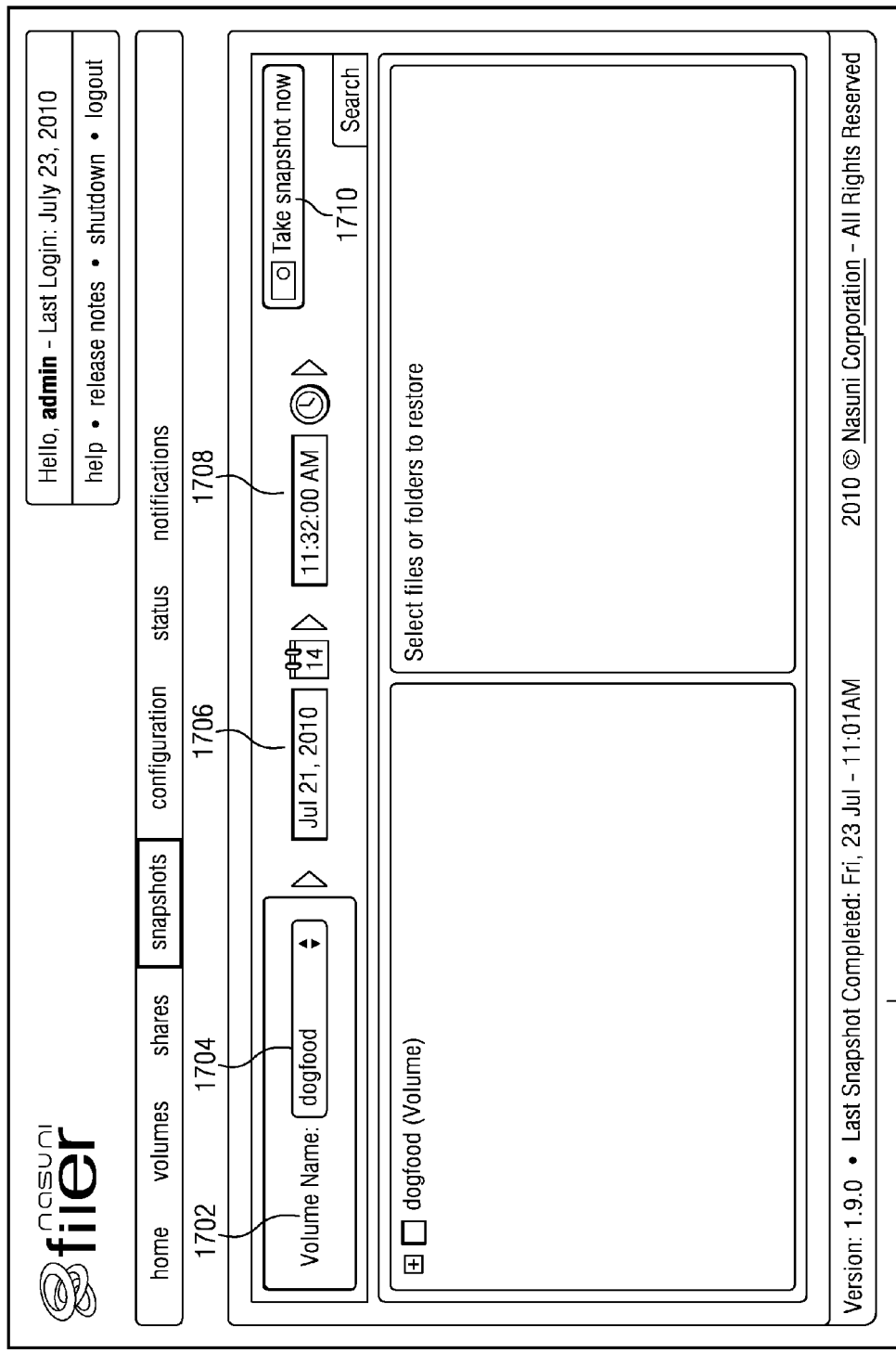
FIG. 17 illustrates a web-based display interface by which an end user initiates a restore from the cloud.
Figure 18:
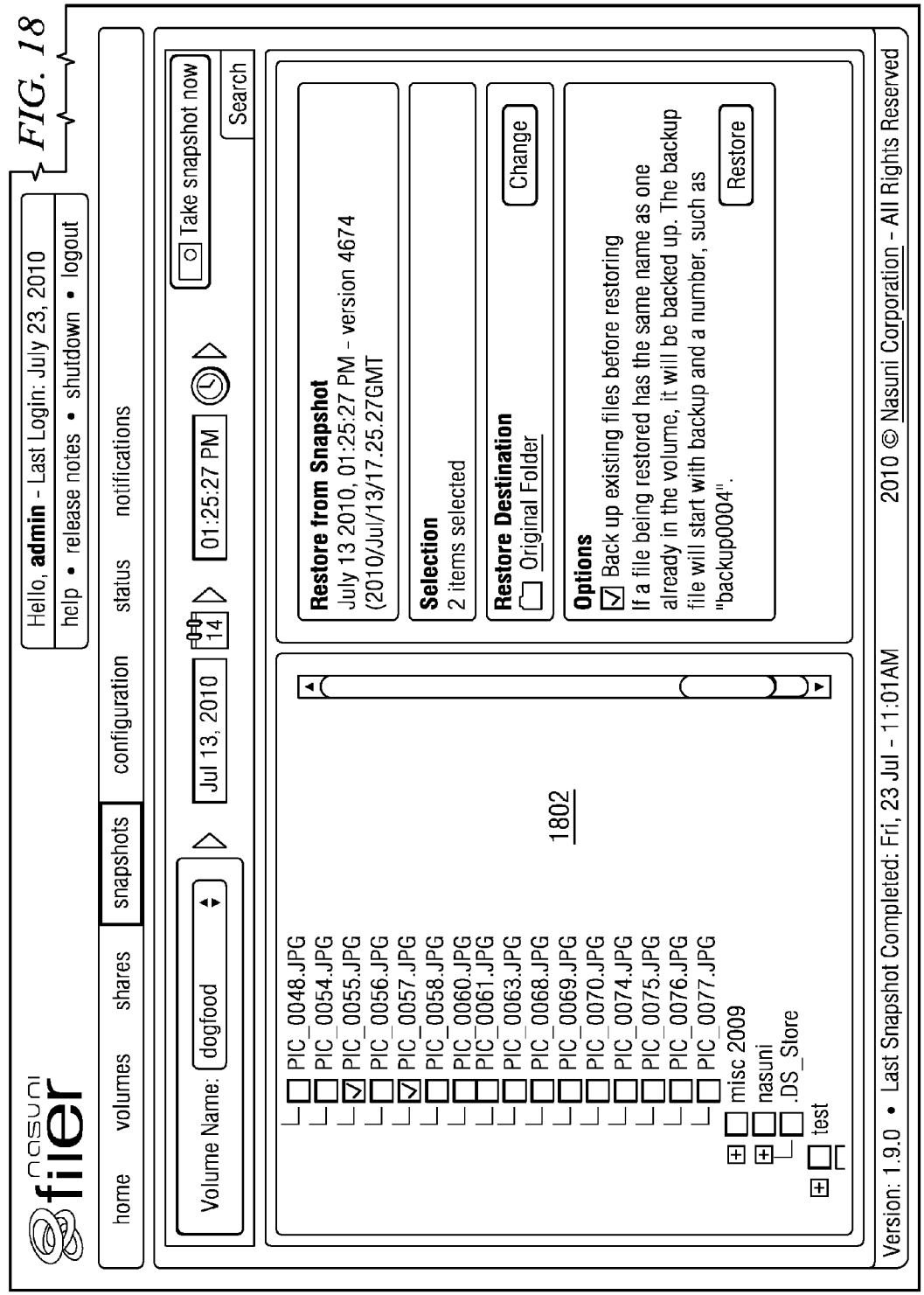
FIG. 18 illustrates the web-based display interface after the user has selected a date and time of a given snapshot and selected particular files or directories to restore.
Figure 20:
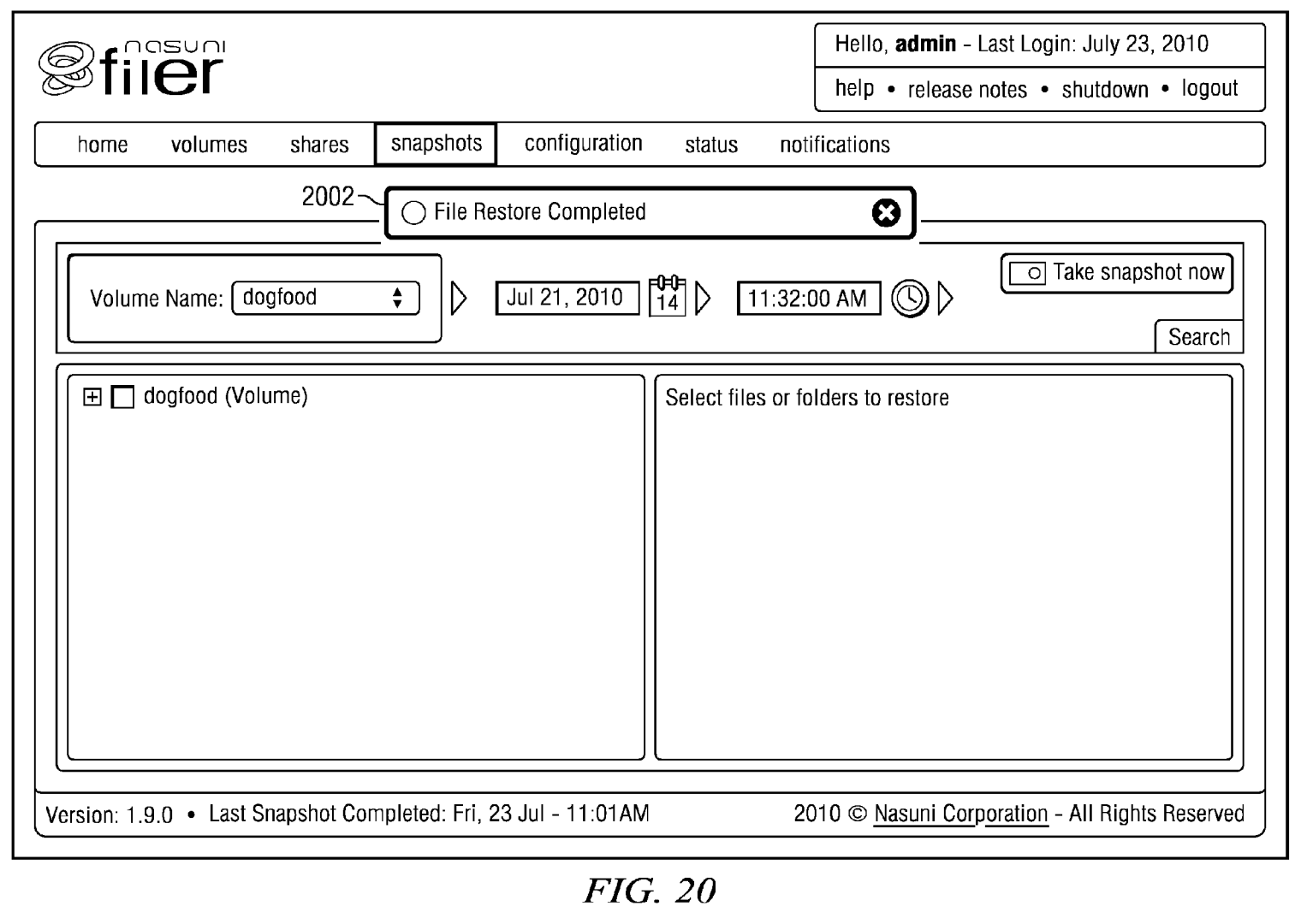

FIGS. 17-20 illustrate a representative web-based display interface for use in enabling an end user to control the restore operation. In particular, FIG. 17 illustrates snapshots page that is reached by navigating to a "snapshots" link in a navigation bar. The window 1700 comprises a volume name field 1702 having a drop down list function 1704, a date fill-in field widget 1706, and a time fill-in field widget 1708. The "Take snapshot now" control 1710 is used to create a particular snapshot (in other words, a version). The end user starts the restore process by identifying the volume name from the drop down list in field 1702, the date from the widget 1706 and the time from widget 1708. FIG. 18 illustrates the web-based display interface after the user has selected a date and time of a given snapshot and selected (from display panel 1802) particular files or directories to restore. FIG. 19 illustrates a restore-in-progress display screen on the web-based display interface after the user has selected the Restore button 1902, and FIG. 20 illustrates the web-based display interface displaying a restore completion notification 2002 indicating that the restore is complete.

Pruning

In the versioned cloud file system, each file is represented by a manifest object, and a series of chunk objects. The manifest object comprises a listing of the chunk objects that make up the file and each entry in the manifest preferably comprises a handle, an offset, and chunk length. The entry also preferably identifies a number of the version in which the chunk was created. A directory in the versioned cloud file system is represented in a similar manner (as is a file), with the contents of the directory being a series of directory entries. A directory entry also comprises a name, as well as other attributes for the file/directory, as well as the handle for the manifest that represents the contents of the file/directory. As described, a version is defined as the tree of objects rooted at a particular root directory manifest. A file-system table of contents (TOC) contains the handle of a latest root directory manifest, as well as a list of all previously root directory manifests. For each table of contents entry, there is also preferably stored a timestamp, version number, and a borrow window (as noted above, preferably an unsigned integer). In the versioned cloud file system, each of the objects is a write-once object, and versions often share objects (file/directory manifests, file/directory chunks).

Pruning a version, as used herein, means an operation starting from the root directory manifest for the version and deleting all objects in the tree that are not referenced in another version. A difficulty in pruning is dealing with the situation where items from that version have been "borrowed" by other versions. Thus, for example, assume that a first version V1 is created upon a write of file A and a write of file B. Now, assume that a second version V2 is created upon a write file C and a delete of file B. If it is then desired to prune V1, it is not possible to do so by merely deleting all the objects that V1 references because File A is still being used (i.e., borrowed) by version V2. As noted above, such "sharing" of objects is a characteristic of the versioned file system. As a consequence, any pruning algorithm must take into consideration two (2) types of objects: (i) objects in the pruned version that have been referenced from previous versions and thus should not be purged (sometimes referred to as "borrowed" objects); and (ii) objects created in the pruned version that are referenced (restored) in later versions (sometimes referred to as "lent" objects). During pruning, any objects that are borrowed or lent are not purged.

As will be seen, during pruning, preferably the search for "lent" objects is constrained by the borrow window of the version to be pruned, and preferably the search for "borrowed" objects is constrained by the size of the borrow window of the version in which the borrowed object was created. Constraining the searches in this manner provides computational and storage efficiencies, as the approach obviates scanning all versions backwards and forwards and limits the searching just to the versions within the above-described windows.

Thus, according to the teachings of this disclosure, a borrow window is associated to each of a set of versions in the versioned file system. A version is then pruned by deleting all objects in the tree associated with the version that, at the time of pruning: (i) are not being lent to any other version within the borrow window of the version being pruned, and (ii) are not referenced in any other version whose borrow window is sufficiently large enough such that an object in the version could have been restored from that other version. Another way of thinking about constraint (ii) with respect to a particular object in the tree associated with the version (being pruned) is that the object is deleted if it does not reside within the lending window of the version in which the object was created. If it is assumed that the borrow window of the version being pruned does not include the current version of the versioned file system, then the temporal limitation ("at the time of pruning") is not necessary, as all of the objects associated with the version being pruned either are borrowed or not (and this fact cannot change during the time the pruning is taking place). Thus, pruning of versions that are still available for borrowing into the current version is not recommended and, in one embodiment, it not permitted at all.

The following describes in detail how a preferred pruning algorithm determines which objects in a tree are not referenced in another version.

Consider pruning a version X with a borrowing window Y. In one embodiment, for each manifest in X, the following characteristics are true: (i) the manifest could be referenced from a previous version only if the directory or file did not change since the immediately previous version (X−1); and (ii) the manifest could be referenced from a later version only if the directory or file did not change between X and an immediate next version (X+1). Thus, to determine whether a manifest is referenced in a version besides X, a check of all manifests in versions (X−1) and (X+1) suffices. If version (X−1) is already pruned, only the most recent version <X needs to be used; likewise, if version (X+1) is already pruned, only the most recent version >X needs to be used. In an alternative embodiment, manifests can be borrowed.

Likewise, with respect to chunks: the following characteristics are true: (i) for chunks created in X, the chunk may be referenced in any version V where X<V<X+Y; with respect to chunks created in previous versions: if the chunk is created in version V (V<X) and the borrowing window of version V is $V_y$, then, if version V has not been pruned, the chunk is still referenced by V, but if V has been pruned the chunk may be referenced by any version VA where $V<V^\wedge<V+V_y$.

Figure 14:
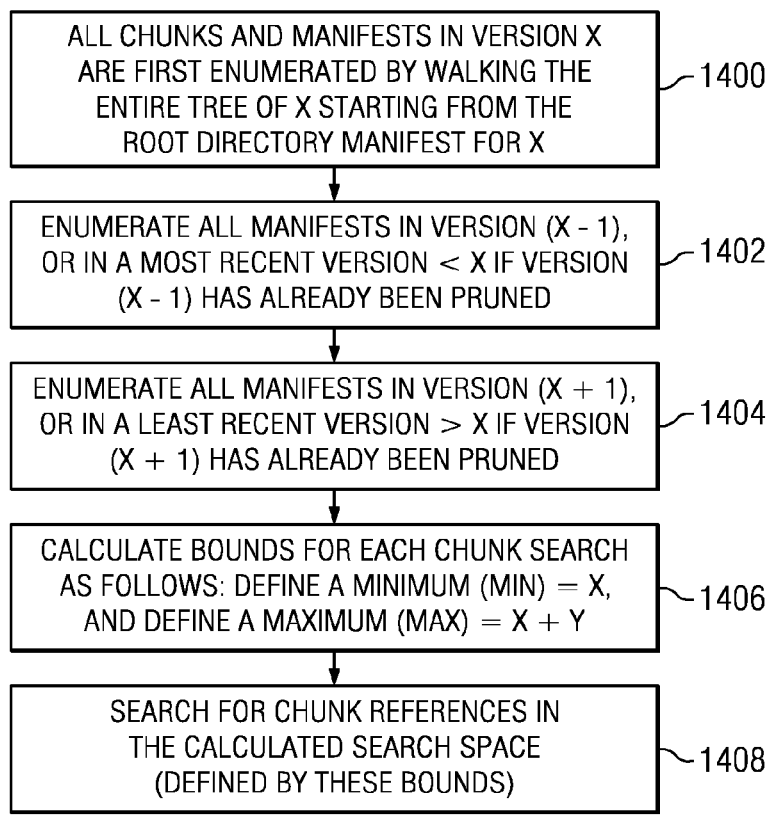
FIG. 14 illustrates a pruning operation according to this disclosure.

A pruning algorithm then proceeds as follows. Reference is made to the process flow shown in FIG. 14. At step 1400, all chunks and manifests in version X are first enumerated by walking the entire tree of X starting from the root directory manifest for X. All manifests in version (X−1), or in a most recent version <X if version (X−1) has already been pruned, are enumerated at step 1402. All manifests in version (X+1), or in a least recent version >X if version (X+1) has already been pruned, are enumerated at step 1404. Steps 1402 and 1404 may be carried out in reverse order, or concurrently. At step 1406, the prune algorithm calculates bounds for each chunk search as follows: define a minimum (min)=X, and define a maximum (max)=X+Y. For each chunk in the list of X, if version created for chunk is <min, min=version created for the chunk. Likewise, for each chunk in the list of X, if version created+borrowing window for that version >max, max=version created+borrowing window for that version. Note that if the borrowing window is not allowed to change, then then max value will always be X+Y, although this is not a limitation. Then, at step 1408, the routine searches for chunk references in the calculated search space (defined by these bounds). Step 1408 enumerates chunks referenced in each version from min to max. Any chunk found in version not=X is then removed from the list of objects for X (if present). All objects remaining in the list for X are only referenced in X and may all be deleted. This completes the prune.

Thus, preferably the pruning algorithm takes into account not only a version back and a version forward, but also preferably all versions within a fast restore range (i.e., a configurable borrow window). This ensures that the pruning operation can be carried out efficiently and in a scalable, reliable manner. If the pruning operation were not constrained in this manner, the operation would be difficult to scale efficiently once the number of versions becomes large (due in part to the sharing of objects across versions).

Figure 15:
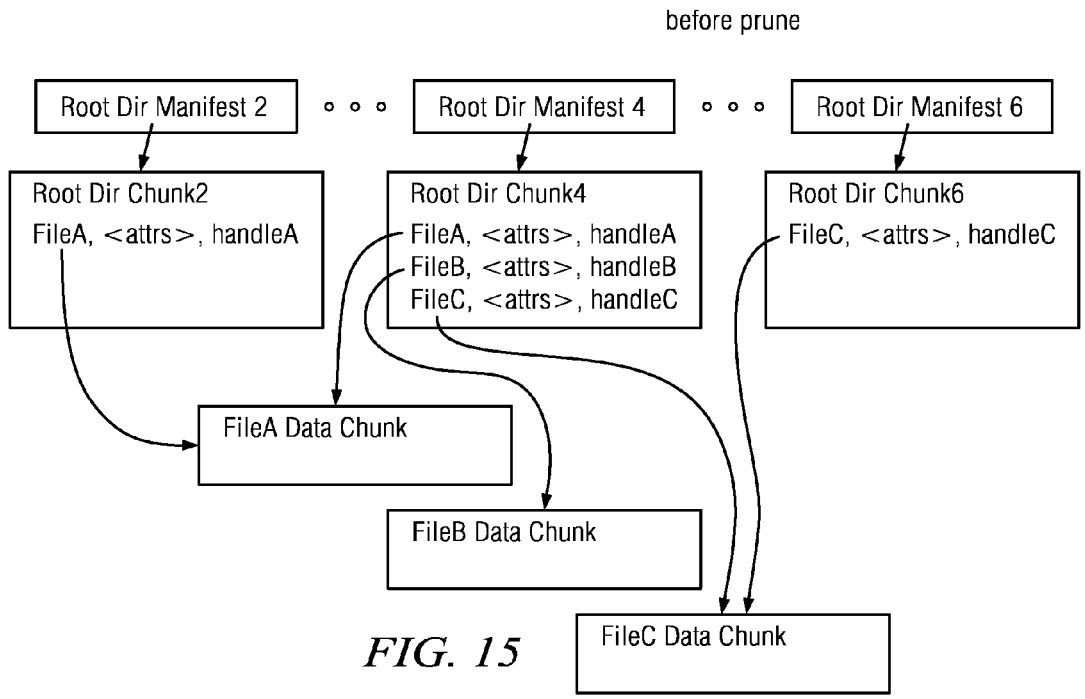
FIG. 15 illustrates a series of versions prior to a prune operation.
Figure 16:
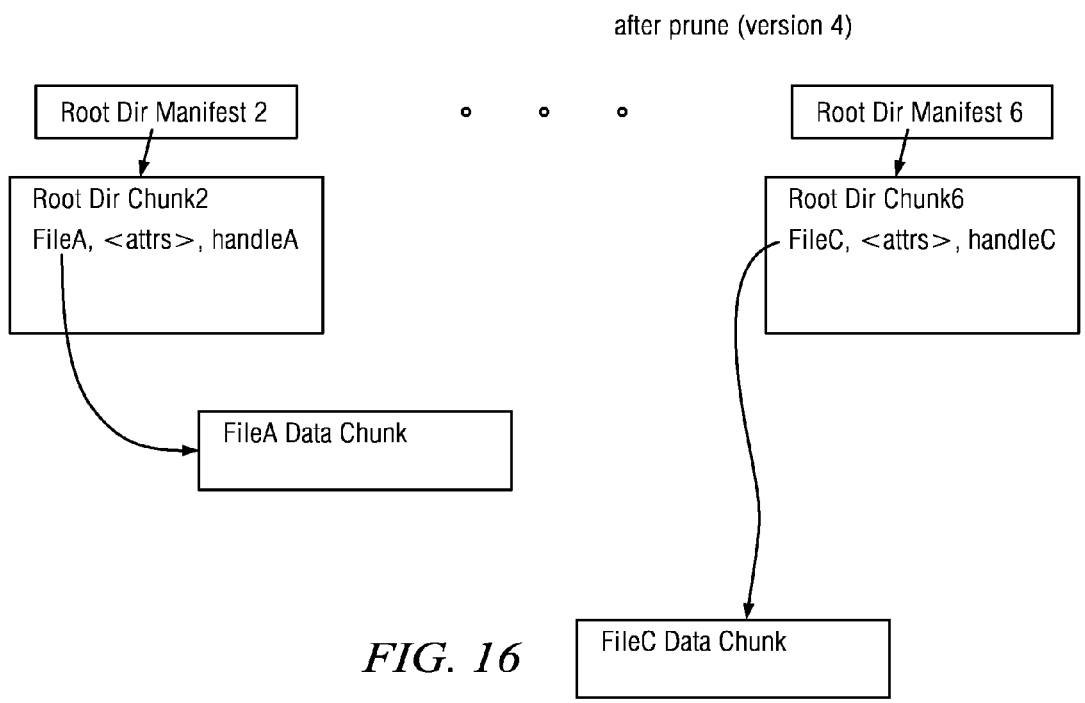
FIG. 16 illustrates the series of versions of FIG. 15 following the pruning of a version.

FIGS. 15 and 16 illustrate how objects (and their borrowing windows) impact the pruning operation. FIG. 15 illustrates a series of versions (looking left to right). When it is desired to prune say, version 4, the above-described algorithm is executed. The result of the prune operation is shown in FIG. 16. In this example, the File B data chunk is deleted because it is not being lent to any other version within the borrow window of version 4 (the version being pruned) version and because it does not reside within the lending window of the version in which the object was created. Because the File A data chunk and the File C data chunk fail to meet these criteria, however, they are not deleted—even though they are part of the version 4 tree (shown in FIG. 15).

In a typical prune operation, the system may need to account for several borrow windows including some of differing values. For example, assume that are ten (10) versions: V1 . . . V10, that the first five versions (V1-V5) each have a borrowing window of 10, and the next first versions (V6-10) each having a borrowing window of 2. Now, consider what happens when it is desired to prune version V9. Because of the first five versions V1-V5 have borrowing windows of 10, objects from V1 could be restored to any version as high as V11, objects from V2 could be restored to any version as high as V12, and so forth. Thus, the prune algorithm must search for references in these early versions, as well as more recent versions that may borrow the object. More generally, the prune algorithm deletes a version from the versioned filed system by deleting all objects in the tree associated with the version that are not referenced in any other version whose borrow window is sufficiently large such that an object in the version could be restored from that other version.

One of ordinary skill in the art will appreciate that the interface described herein provides a primary, local, but preferably non-resident application layer to interface the local file system to the data store. As has been described, the interface caches user data and file system metadata (organized in a unique manner) to the data store (e.g., one or more SSPs), preferably as a service. The metadata provides a level of indirection (from the data), and the VFS enables it to be stored separately from the data that it represents.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the interface functions is tangible.

A given implementation of the disclosed subject matter is software written in a given programming language that runs on a server on an Intel-based hardware platform running an operating system such as Linux. As noted above, the interface may be implemented as well as a virtual machine or appliance, or in any other tangible manner.

While given components of the system have been described separately, one of ordinary skill will appreciate that some of the functions may be combined or shared in given instructions, program sequences, code portions, and the like.

Having described our invention, what we now claim is as follows:

1. A non-transitory computer-readable medium having stored thereon program instructions that, when executed by a processor, cause the processor to:
   perform operations associated with a versioned file system comprising a set of versions, wherein each version comprises a tree of write-once objects, wherein versions share objects, and wherein each version has a borrow window associated therewith, the borrow window identifying a fixed number of subsequent file system versions from which an object can be shared;
   in response to a receipt of a request to restore a portion of a prior version of the versioned file system, return file and directory metadata of the restored portion prior to returning contents of the restored portion;
   determine whether a current version of the file system is within the respective borrow windows of shared objects associated with the restored portion;
   if the current version of the file system is within the respective borrow windows of the shared objects associated with the restored portion, restore the contents of the restored portion without overwriting data in the current version by associating the shared objects for the restored portion with a new location in the versioned file system, wherein the association results in first and second identifiers within the versioned file system pointing to identical data objects in the restored portion, the first and second identifiers associated with the prior version and a new version, respectively;
   if the current version does not exist within the respective borrow windows of the shared objects associated with the restored portion, perform a slow restore of the restored portion; and
   upon receipt of a request to open the restored portion that is distinct from the request to restore, return the contents of the restored portion regardless of whether current version exists within the respective borrow windows.

2. The computer-readable medium as described in claim 1 wherein a borrow window of a first version differs from a borrow window of a second version.

3. The computer-readable medium as described in claim 1 wherein the restored portion is one of: a file, and a portion of a file.

4. The computer-readable medium as described in claim 1 further including program code operative to provide a web-based interface, wherein the request is initiated from the web-based interface.

5. The computer-readable medium as described in claim 1 wherein the restored portion comprises a directory.

6. The computer-readable medium as described in claim 1 wherein the metadata is only for the restored portion.

7. A method of restoring a file in a versioned file system, the method comprising:
   receiving a request to restore a portion of a prior version of the versioned file system;
   returning file and directory metadata of the restored portion prior to returning contents of the restored portion;
   stitching the file and directory metadata into a current version of the versioned file system such that the current version appears to include the restored portion prior to returning the contents of the restored portion;
   determining whether the current version of the file system is within the respective borrow windows of shared objects associated with the restored portion;
   if the current version of the file system is within the respective borrow windows of the shared objects associated with the restored portion, restoring the contents of the restored portion without overwriting data in the current version by associating the shared objects for the restored portion with a new location in the versioned file system, wherein the association results in first and second identifiers within the versioned file system pointing to identical data objects in the restored portion, the first and second identifiers associated with the prior version and a new version, respectively;
   if the current version does not exist within the respective restore borrow windows of the shared objects associated with the restored portion, performing a slow restore of the restored portion; and
   receiving a request to open the restored portion that is distinct from the request to restore; and
   in response to receiving the request to open the restored portion, returning the contents of the restored portion regardless of whether the current version exists within the respective borrow windows.

8. The method of claim 7 wherein a borrow window of a first version differs from a borrow window of a second version.

9. The method of claim 7 wherein the restored portion is one of: a file, and a portion of a file.

10. The method of claim 7 further comprising receiving the request from a web-based interface.

11. The method of claim 7 wherein the restored portion comprises a directory.

12. The method of claim 7 wherein the metadata is only for the restored portion.

13. A system comprising:
a processor; and
a memory having program instructions stored thereon that, when executed by the processor, cause the processor to:
perform operations associated with a versioned file system comprising a set of versions, wherein each version comprises a tree of write-once objects, wherein versions share objects, and wherein each version has a borrow window associated therewith the borrow window identifying a fixed number of subsequent file system versions from which an object can be shared;
in response to a receipt of a request to restore a portion of a prior version of the versioned file system, return file and directory metadata of the restored portion prior to returning contents of the restored portion;
determine whether a current version of the file system is within the respective borrow windows of shared objects associated with the restored portion;
if the current version of the file system is within the respective borrow windows of the shared objects associated with the restored portion, restore the contents of the restored portion without overwriting data in the current version by associating the shared objects for the restored portion with a new location in the versioned file system, wherein the association results in first and second identifiers within the versioned file system pointing to identical data objects in the restored portion, the first and second identifiers associated with the prior version and a new version, respectively;
if the current version does not exist within the respective restore borrow windows of the shared objects associated with the restored portion, perform a slow restore of the restored portion; and
in response to receiving the request to open the restored portion, return the contents of the restored portion regardless of whether the current version exists within the respective borrow windows.

14. The system of claim 13 wherein a borrow window of a first version differs from a borrow window of a second version.

15. The system of claim 13 wherein the restored portion is one of: a file, and a portion of a file.

16. The system of claim 13 wherein the restored portion comprises a directory.

17. The system of claim 13 wherein the metadata is only for the restored portion.

* * * * *